Patented June 11, 1940

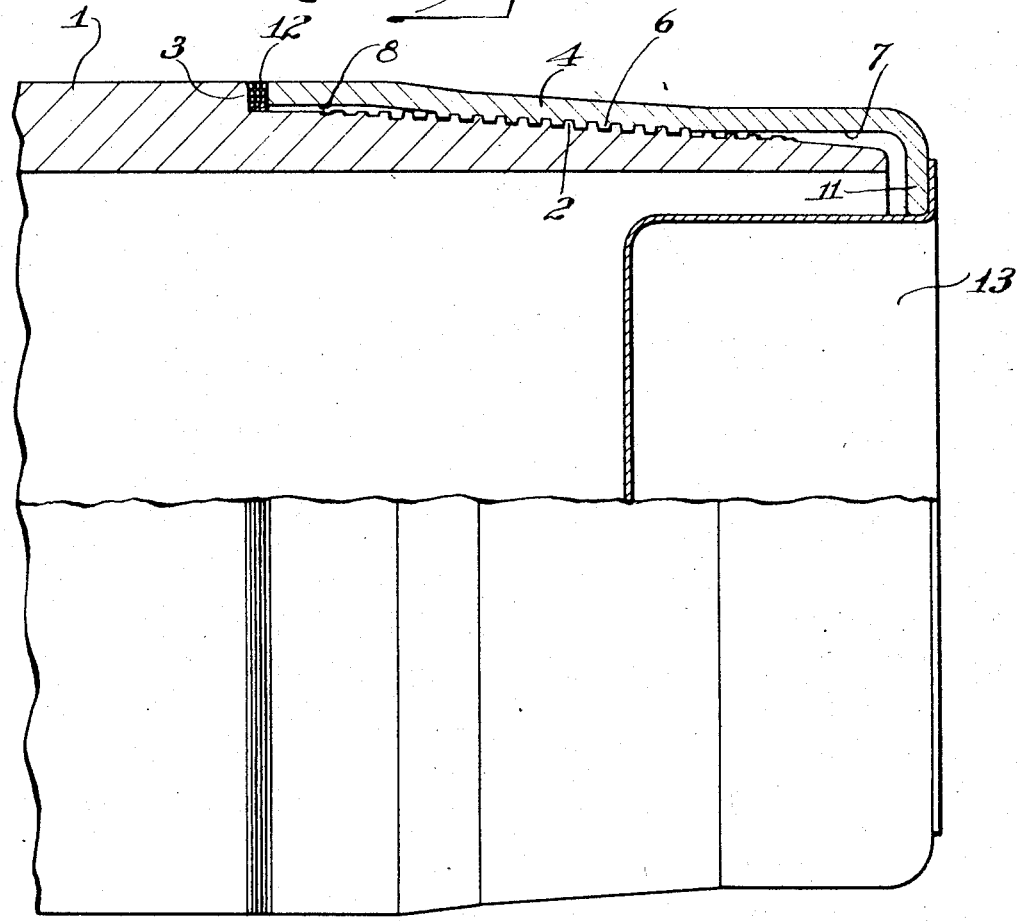
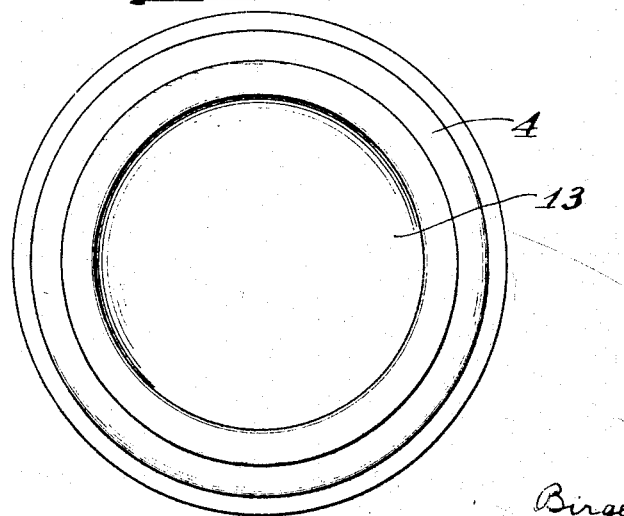

2,204,130

UNITED STATES PATENT OFFICE 2,204,130

PIPE THREAD PROTECTOR

Birger Engstrom, Pittsburgh, Pa., assignor to Forster Manufacturing Corporation, Pittsburgh, Pa., a corporation of Pennsylvania Application September 15, 1938, Serial No. 230,074

2 Claims. (Cl. 138—96)

This invention relates to protectors for the ends of pipes, and more particularly to thread protectors for pipes having an outside shoulder at the inner end of an outside thread.

In certain types of pipes of this character the shoulder forms a seal against the end of the adjoining pipe to which the first pipe is connected. Therefore, it is highly desirable that this shoulder, as well as the pipe threads, be protected so that the seal will not be impaired. However, whether or not these shoulders form a seal, they often interfere with sliding the pipes lengthwise to pile or unpile them because the protruding shoulders catch on the ends or shoulders of other pipes. On the other hand, if the protector projects radially beyond the shoulder, blows against its inner end are quite likely to damage the pipe threads.

It is among the objects of this invention to provide a pipe thread protector for use with a pipe having an outside shoulder spaced from one end, the protector being simple and inexpensive in construction and adequately protecting the pipe shoulder without itself forming an obstruction or serving as a means through which the pipe threads can be injured.

In accordance with this invention a metal sleeve is formed for fitting over the end of a pipe having an outside shoulder spaced from that end. The outside diameter of the inner end of the sleeve is preferably substantially the same as that of the pipe shoulder, and the outer surface of this inner end is connected by a gradually converging surface to the portion of the sleeve having the smallest diameter. The inner surface of the sleeve is threaded throughout its central portion, but the inner end portion of the sleeve is preferably spaced from the pipe threads. This is also true of the outer end portion of the sleeve. The inner end of the sleeve is preferably spaced from the shoulder, and packing or sealing material may be disposed in this annular space to prevent foreign matter from getting between the sleeve and pipe. The outer end of the sleeve may be permanently sealed for the same purpose. With this construction the outer surface of the sleeve is free of sharp corners which might form an obstruction, and the inner end of the sleeve protects the pipe shoulder without extending beyond it where it might be struck by other pipes.

The preferred embodiment of the invention is illustrated in the accompanying drawing in which Fig. 1 is a side view of my pipe thread protector, partly in longitudinal section, applied to a pipe; and Fig. 2 is a reduced view of the outer end of the protector.

Referring to Fig. 1 of the drawing, a pipe 1 is provided at one end with an outside thread 2 at the inner end of which there is a radial wall that forms an outside shoulder 3. This pipe may be of the type disclosed in Patent No. 2,062,407 to Eaton, but it is not limited thereto. The protector designed to protect the thread and shoulder of this pipe comprises a metal sleeve 4 which is circular in cross section and adapted to fit over the threaded end of the pipe. The inner surface of the sleeve is provided with a thread 6 so that the protector can be screwed onto the pipe. As the threaded end of the pipe is tapered, the portion of the sleeve that engages it is also tapered, but as it is undesirable to cut any more threads in the sleeve than are necessary, the outer end portion of the protector is made cylindrical so that its inner surface 7 will be spaced laterally from the encircled pipe threads and not require threads. Partly for the same reason the inner end portion of the sleeve is expanded, whereby its inner surface 8 is unthreaded and spaced from the pipe.

It is a feature of this invention that the protector sleeve not only protects the pipe thread, but also protects pipe shoulder 3. Accordingly, the inner end portion of the sleeve is expanded sufficiently to make its outside diameter substantially the same as that of the adjacent pipe shoulder, whereby neither the sleeve nor shoulder projects radially an appreciable distance beyond the other. This construction prevents the radial surfaces of the shoulder and inner end of the sleeve from being struck by another object. To prevent this enlarged portion of the sleeve from itself being an obstruction to endwise movement of the pipe in a pile of pipes, its outer surface is connected to the smaller outer end portion of the sleeve by a gradually converging surface, by which is meant a surface that tapers so gradually that a pipe or other object will slide over it without striking it a hard blow or sticking thereon.

An inwardly extending flange 11 integral with the outer end of the sleeve strengthens it against end blows. This flange may also be in the form of a straight closed end, thus making a cup of the sleeve, if desired. The sleeve is made of such length that when it is tightly in place an annular space is left between the sleeve and shoulder. Packing material 12, preferably in cord form, may be disposed in this space to prevent foreign matter, such as water and dirt, from getting between the sleeve and pipe threads. To secure the packing material securely in place, it is wound around the pipe before the sleeve has been fully tightened. Then, when the sleeve is drawn up tight, it presses the packing material tightly against the pipe shoulder. It is also desirable to seal the outer end of the sleeve for the same reason. This may be done by providing the opening in the outer end of the sleeve, bounded by flange 11, with a friction cap 13 or by having the sleeve cup shaped without any opening.

With the above-described protector the pipe thread is shielded from injurious impacts both radially and longitudinally of the pipe. Likewise, the shoulder is protected, which is especially desirable when it is a sealing member. Finally, the disadvantage of a projecting shoulder in handling of the pipe is removed by my protector which is so designed that it does not itself have the same disadvantage. It will be understood that this protector is likewise suitable for protecting the ends of tool joints used in well drilling.

According to the provisions of the patent statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. A protector for use with a pipe having an outside shoulder spaced from one end, comprising a sleeve adapted to fit over the end of the pipe with its inner end spaced from the pipe shoulder, the outside diameter of said inner end being greater than that of the rest of the sleeve, the outer surface of said inner end being connected by a gradually converging surface to the portion of the sleeve having the smallest diameter, and packing material disposed in the annular space between the pipe shoulder and said inner end of the sleeve.

2. The combination with a pipe having an outside shoulder spaced from one end, of a protective sleeve fitting over the end of the pipe with its central portion in engagement therewith, the outer surface of the sleeve being substantially smooth and continuous from end to end and the innermost end portion of the sleeve being enlarged and spaced from the pipe with its outside diameter substantially the same as that of the pipe shoulder, and said enlarged portion being connected to said central portion of the sleeve by a flaring portion, whereby said outer surface of the sleeve presents no obstruction to longitudinal movement of said pipe.

BIRGER ENGSTROM.